(12) United States Patent
Free et al.

(10) Patent No.: US 8,718,261 B2
(45) Date of Patent: *May 6, 2014

(54) EFFICIENT AND COST-EFFECTIVE DISTRIBUTED CALL ADMISSION CONTROL

(75) Inventors: James Douglas Free, Thornton, CO (US); Christopher D. Baldwin, Princeton, NJ (US); Chandra Mouli Ravipati, Thornton, CO (US); Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 40 days.

This patent is subject to a terminal disclaimer.

(21) Appl. No.: 13/187,589

(22) Filed: Jul. 21, 2011

(65) Prior Publication Data
US 2013/0022192 A1    Jan. 24, 2013

(51) Int. Cl.
*H04M 7/00* (2006.01)
*H04J 3/16* (2006.01)
*H04J 3/22* (2006.01)

(52) U.S. Cl.
USPC ............... 379/221.07; 379/219; 379/221.04; 370/468

(58) Field of Classification Search
USPC ............. 379/221.07, 219, 221.01, 221.04, 379/220.01
See application file for complete search history.

(56) References Cited

U.S. PATENT DOCUMENTS

| | | | |
|---|---|---|---|
| 6,233,223 B1 | 5/2001 | Sabry et al. | |
| 7,324,552 B1 | 1/2008 | Galand et al. | |
| 7,856,497 B2 | 12/2010 | McKinnon et al. | |
| 7,890,656 B2 | 2/2011 | Nakamichi et al. | |
| 8,010,677 B2 | 8/2011 | Brunson et al. | |
| 8,223,727 B2 * | 7/2012 | Mitsuhori | 370/338 |
| 8,305,895 B2 * | 11/2012 | Chang et al. | 370/232 |
| 2001/0048682 A1 * | 12/2001 | Fichou et al. | 370/392 |
| 2003/0236887 A1 | 12/2003 | Kesselman et al. | |
| 2004/0151166 A1 | 8/2004 | Tsukagoshi et al. | |
| 2007/0106774 A1 | 5/2007 | Yokota et al. | |
| 2007/0294410 A1 | 12/2007 | Pandya et al. | |

(Continued)

FOREIGN PATENT DOCUMENTS

| | | |
|---|---|---|
| CN | 101420736 | 4/2009 |
| EP | 1806875 | 7/2007 |
| EP | 1953994 | 8/2008 |
| JP | 2001-148713 | 5/2001 |

OTHER PUBLICATIONS

Carter et al. "Server Selection Using Dynamic Path Characterization in Wide-Area Networks," INFOCOM '97. Sixteenth Annual Joint Conference of the IEEE Computer and Communications Societies. Driving the Information Revolution Apr. 7, 1997, vol. 3, pp. 1014-1021.

(Continued)

*Primary Examiner* — William Deane, Jr.
(74) *Attorney, Agent, or Firm* — Sheridan Ross P.C.

(57) ABSTRACT

A distributed call control system is provided that can allot bandwidth amongst several call controllers. The distributed call control system includes one or more access elements that interface with a cloud that execute two or more instances of call processing servers that administer call control. The cloud members negotiate and determine bandwidth allocation amongst the members and the access elements. If an access element requires more bandwidth, the access element assesses its own needs and requests more bandwidth from the cloud. The negotiation and requests for bandwidth are accomplished with a set of dynamic and static bandwidth data that regiment the control of the bandwidth.

20 Claims, 7 Drawing Sheets

(56) References Cited

U.S. PATENT DOCUMENTS

| | | | |
|---|---|---|---|
| 2008/0052387 A1 | 2/2008 | Heinz et al. | |
| 2008/0052393 A1 | 2/2008 | McNaughton et al. | |
| 2009/0271512 A1 | 10/2009 | Jorgensen | |
| 2010/0074271 A1 | 3/2010 | Iwamura | |
| 2010/0094986 A1 | 4/2010 | Zuckerman et al. | |
| 2010/0278327 A1* | 11/2010 | Haserodt et al. | 379/221.07 |

OTHER PUBLICATIONS

Extended European Search Report for European Patent Application No. 10161659.7, mailed Sep. 16, 2010.

Notice of Allowance for U.S. Appl. No. 12/554,714, mailed Sep. 14, 2012.

Official Action for U.S. Appl. No. 12/554,714, mailed May 2, 2012.

Official Action (English translation) for Chinese Patent Application No. 201010213945.3 dated Oct. 10, 2013, 9 pages.

Official Action (with English translation) for Korean Patent Application No. 2010-0041988 dated Oct. 16, 2013, 7 pages.

Official Action (with partial English translation) for Japanese Patent Application No. 2010-104822 mailed Dec. 27, 2013, 3 pages.

* cited by examiner

EFFICIENT AND COST-EFFECTIVE DISTRIBUTED CALL ADMISSION CONTROL

CROSS REFERENCE TO RELATED APPLICATION

The present application is related to U.S. patent application Ser. No. 12/554,714, filed on Sep. 4, 2009 (published as U.S. Patent Publication No. 2010/0278327 on Nov. 4, 2010), which claims priority to U.S. Provisional Patent Application No. 61/175,320 filed on May 4, 2009, both of these documents are incorporated by reference herein in their entirety for all that they teach and for all purposes.

BACKGROUND

Bandwidth management is an important feature in call processing and necessary for preventing network overload. However, many environments require that certain types of calls or uses of bandwidth be prioritized or otherwise treated differently than others. There might be a pool of available resources of which some users can use only a subset while others can use the entire pool. A distributed cluster may be used to manage bandwidth in which a single element using the fastest and most advanced computer hardware available is still not fast enough to meet demand.

However, there may be situations where entities outside the distributed cluster need to use the cloud's managed bandwidth. The need to interface with many different types of outside entities can cause performance problems for the distributed cluster. Thus, the distributed cloud may provide bandwidth but may suffer performance degradation due to the interaction with outside entities.

SUMMARY

It is with respect to the above issues and other problems that the embodiments presented herein were contemplated. Herein, a distributed call control system is provided that can allot bandwidth. The distributed call control system is as described in U.S. Patent Publication No. 2010/0278327, which is incorporated by reference above. The distributed call control system may be represented by a cloud.

Starting with the cloud of bandwidth sharers, the network may add additional participants that are produced by different vendors and each serve a fraction of the traffic that cloud members may serve. It is impractical to ask each adopting vendor to join the cloud, and if these vendors did, cloud member requests for resources would become time-consuming. Thus, the system adopts a spider architecture, where each node (leg) makes requests of the central core, but the central core is not a single server, but the cloud. Thus, the network is configured as a cloud within a spider.

The legs of the spider configuration are connections to vendors, which may be called "access elements". Whenever an access element needs resources, the access element sends a message to the cloud. A member of the cloud processes the request for resources from the access element as if the access element was a member of the cloud. The processing of the request is as described in U.S. Patent Publication No. 2010/0278327. The cloud member can issue a response to the access element indicating the fulfillment or rejection of the request.

The requests from the access elements may consist of several components—the multiple bandwidth pools (as described in U.S. Provisional Patent Application 61/394,025), a minimum bandwidth need, and a maximum bandwidth need for each pool. The cloud member can return a response with either nothing or a value within the requested range. Thus, if the cloud member cannot meet the minimum bandwidth need, the cloud member will return a response with nothing available. The messaging can be completed with a Session Initiation Protocol (SIP) PUBLISH/200 exchange.

There are several advantages to the embodiments presented herein that add access elements to the cloud/spider architecture. The access elements can execute a relatively simple Application Programming Interface (API) to communicate, with the cloud, for requesting resources. The API can be published for third-party vendors. The access element requests for resources do not result in requests to non-cloud members; the number of external requests can be limited to the number of cloud members (the access element requests to one cloud member and that cloud member's requests to other members of the cloud). This reduction in requests substantially improves worst-case response time. In short, by assigning different elements status as either a core cloud member or an access element, the embodiments balance performance tradeoffs and business needs in making the communication system work at previously unrealized scale.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It being understood that various changes may be made in the function and arrangement of elements without departing from the spirit and scope of the invention as set forth in the appended claims.

Figure 1:
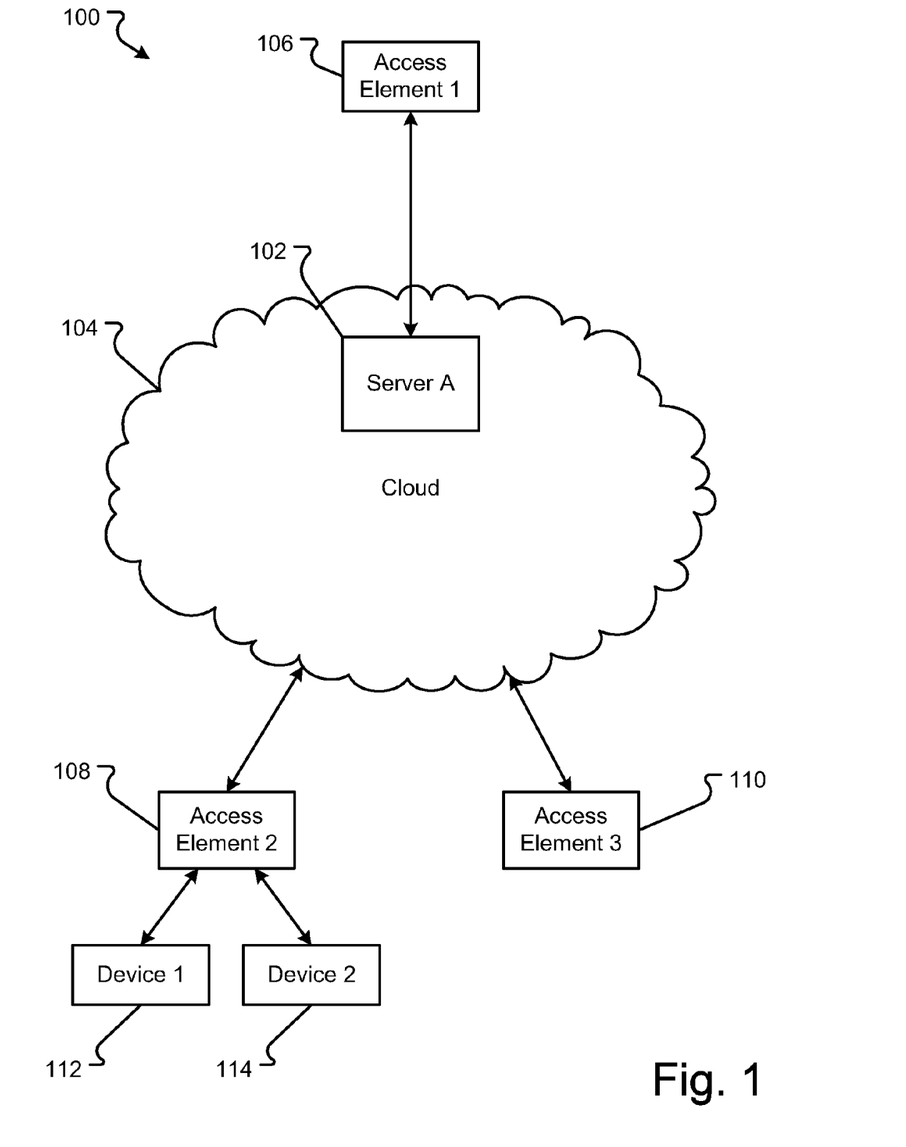
FIG. 1 is a block diagram of an embodiment of a distributed calling system that can distribute network bandwidth amongst access elements that communicate with a cloud including calling servers.

An embodiment of a system 100 for administering phone calls is shown in FIG. 1. The several components of the system 100 may be hardware, software, or a combination of hardware and software. Descriptions of the computer system environment and the computer systems which may embody the several components of system 100 are described in conjunction with FIGS. 6 and 7. As such, a functional description of the several components of system 100 shall follow.

In embodiments, the system 100 comprises a cloud 104 which may include two or more servers 102 operable to administer calls and in communication through a network within the cloud. Each server 102 may manage the phone calls for a branch (not shown) and or one or more access elements 106, 108, and/or 110 through a network within the cloud 104. An access element 106, 108, and/or 110 can be a separate device that communications with one or more communication devices, e.g. device 1 112 and/or device 2 114, which may be telephones, mobile devices, etc. For example, n access element 106, 108, and/or 110 may be part of a call center or site of an enterprise network. Typically, the access elements 106, 108, and/or 110 can be a collection of Internet Protocol (IP) addresses and/or telephone numbers that may interface with devices that do not communicate using SIP. In other embodiments, the access element 106, 108, and/or 110 is a communication device itself. The networks can be any trusted or untrusted network as discussed in conjunction with FIGS. 6 and 7 that allow for the communication of data between the access element 106, 108, and/or 110 and the cloud or between members of the cloud.

The system 100 manages phone calls or requests for bandwidth from one or more IP addresses at one or more access elements 106, 108, and/or 110. As an example, a phone call may be requested from a access element 1 106. The request may be sent to the server 102 over a network. Before allowing the call, the server 102 must determine if the cloud 104 has enough bandwidth. Generally, the cloud 104 is bandwidth limited. As such, the group of servers within the cloud 104 must share the bandwidth. Thus, the server A 102 must be able to determine if the phone call will have enough bandwidth in the system 100.

The cloud 104 can include two or more servers, e.g. server 102, that share the available bandwidth. To share the bandwidth, the cloud 104 can allot each server in the cloud 104 an amount of bandwidth. As each server within the cloud 104 administers or controls a call, a portion of the allotted bandwidth is employed. Thus, the server 102 may control what bandwidth is given to the access element 106 based on the bandwidth allotted to the server 102. If more bandwidth is required for the server 102 or the access element 106, the server 102 can request more bandwidth from the other members of the cloud 104.

Figure 2:
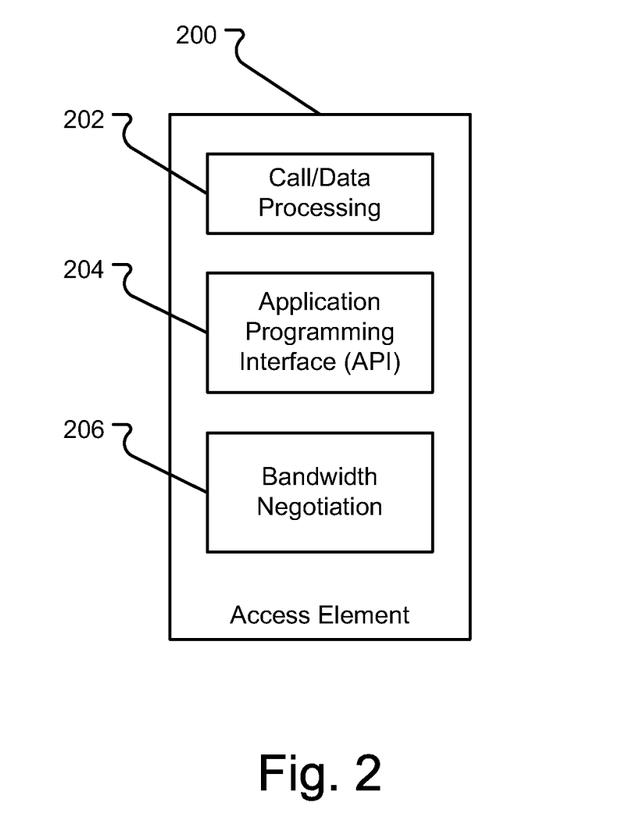
FIG. 2 is a block diagram of an embodiment of an access element.

An embodiment of an access element 200 is shown in FIG. 2. The access element 200 can be the same as or similar to access elements 106, 108, and/or 110 (FIG. 1). In embodiments, the access element 200 is a computer system as described in conjunction with FIG. 7. The access element 200 can have one or more components, which may execute as computer modules. The access element 200 can include one or more of, but is not limited to, a call/data processing server 202, an API 204, and/or a bandwidth negotiation module 206.

The call processing server 202 administers or control calls for the access element 200. The call processing server 202 receives requests for phone calls from an IP address or other identifier of a device that communicates with the access element 200. The call processing server 202 may route the call as required to complete the call. However, in embodiments, the call processing server 202 determines if the call has adequate bandwidth. If bandwidth is required, the call processing server 202 requests bandwidth, through the API 204, from the cloud 104. In some embodiments, the call processing server 202 may also function as a group administrator as explained hereinafter.

The API 204 can communicate with the cloud 104. Thus, while the access element 200 can communicate with devices using a legacy protocol (e.g., H.3232), the API 204 allows the access element 200 to communicate with the cloud 104 using SIP. Generally, every access element 200 includes an API 204. The API 204 sends messages to request bandwidth from the cloud 104. An embodiment of a request messages is described in conjunction with FIG. 3. The API 204 may also receive the responses from the cloud 104. The responses can provide bandwidth information, such as the amount of bandwidth provided or whether bandwidth is provided. The response message information may be provided to the bandwidth negotiation module 206 or call/data processing server 202 to deploy the provided resources. The call processing server 202 and API 204 allows each access element 200 to separately manage bandwidth requirements of connected devices without having to communicate continuously with the cloud 104.

The bandwidth negotiation module 206 can store and manage control information that allows the access element 206 to determine if enough bandwidth is available and whether to contact the cloud 104 for more bandwidth. Thus, as devices interface with the access element 200, the bandwidth negotiation module 206 determines the device requirements. If more bandwidth is needed, the bandwidth negotiation module 206 can signal the API to request bandwidth from the cloud 104. Further, the bandwidth negotiation module 206 allots and manages the bandwidth that is provided by the cloud 104 and can control the bandwidth dynamically.

Figure 3:
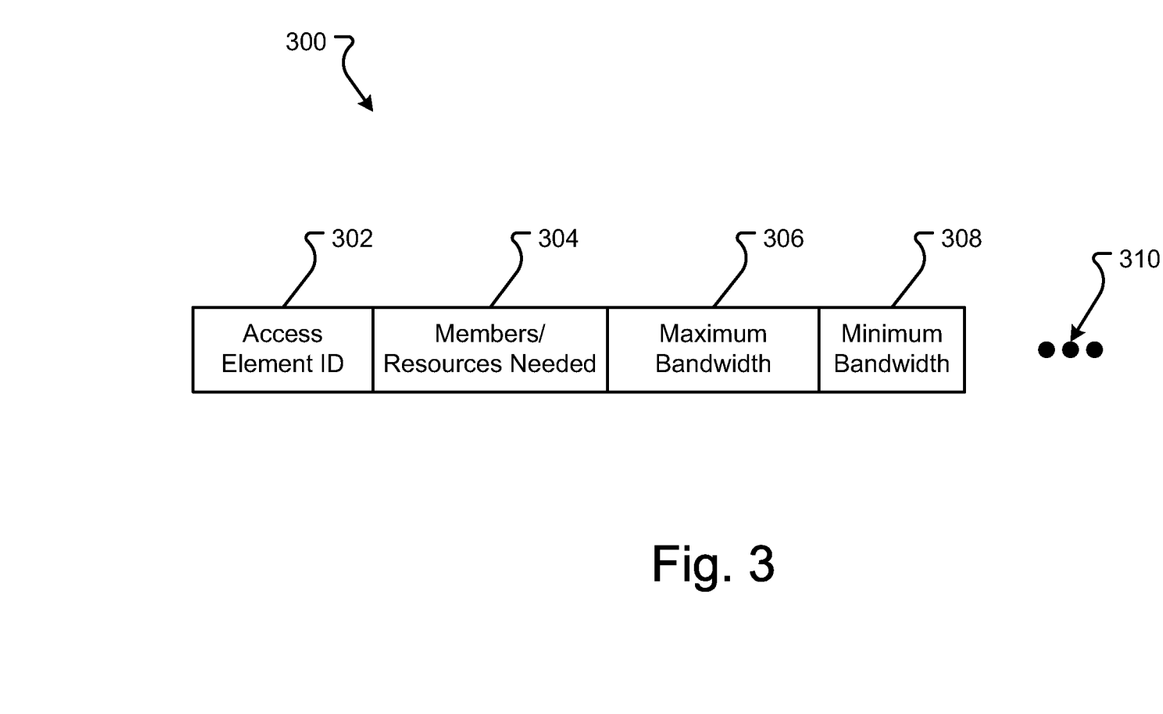
FIG. 3 is a block diagram of a data structure that is received by a calling server in the cloud from an access element for distributing and requesting bandwidth.

An embodiment of a data structure 300 embodying a request for resources that may be sent by the API 204 (FIG. 2) is shown in FIG. 3. The data structure 300 can be a file, object, etc. stored in an object-oriented database, a relational database, etc. The data structure 300 can include one or more portions. A portion may represent a field in a database file, a value or characteristic or an object, etc. There may be more or fewer portions than those shown in FIG. 3, as represented by ellipses 310. It should be noted that the data structure 300 can include or another data structure can include the data described in U.S. Patent Publication No. 2010/0278327, published on Nov. 4, 2010, which is incorporated by reference herein in its entirety for all that it teaches and for all purposes.

The access element ID 302 is any numeric, alphanumeric, or other code that uniquely identifies the access element ID 302. In embodiments, the access element ID 302 is a globally unique identifier (GUID). Each access element 200 can have an access element ID 302. The access element ID 302 can be provided to the cloud 104 for directing communications.

The members 304 can contain the number or type of devices being serviced by the access element 200. In alternative embodiments, the resources needed 304 are provided. In other words, what type or kind of resources. For example, the resources needed 304 can include whether bandwidth is needed or other resources from the cloud.

The maximum bandwidth 306 designates the most bandwidth that may be needed by the access element 200. The maximum bandwidth 306 can be used to determine allotments to the access element 200 or to audit the bandwidth used by the access element 200. Generally, the access element 200 maintains the maximum bandwidth 306 for the devices 112 and/or 106. After the access element is provided bandwidth, the access element ID 302, the members and/or resources needed 304, and the maximum bandwidth 306 are static unless an event (e.g., a device failure, etc) changes the access element 200 or the devices serviced by the access element 200.

The minimum bandwidth 308 provides to the cloud 104 the amount of bandwidth that needs to be allotted to the access element 200. Per call bandwidth is the amount of bandwidth needed for each call. A per call bandwidth can include an average amount of bandwidth used per call or denotes the highest historical bandwidth needed for a call by access element 200. The currently used bandwidth is a measure of that amount of bandwidth being used by the access element 200 to conduct all the calls currently administered by the access element 200. As calls are started or completed, the currently used bandwidth changes. The minimum bandwidth 308 may be based on the average per call bandwidth multiplied by the number of devices being services and/or the currently used bandwidth. The minimum bandwidth 308 may also represent a bandwidth threshold at which the access element 200 will need to request more bandwidth. For example, the bandwidth threshold may be 80% of the maximum bandwidth 306. If the currently used bandwidth exceeds the bandwidth threshold, the access element 200 would need to request more bandwidth. Other values, measurements, and calculation results may be used in the request information 300 as provided below.

Figure 4:
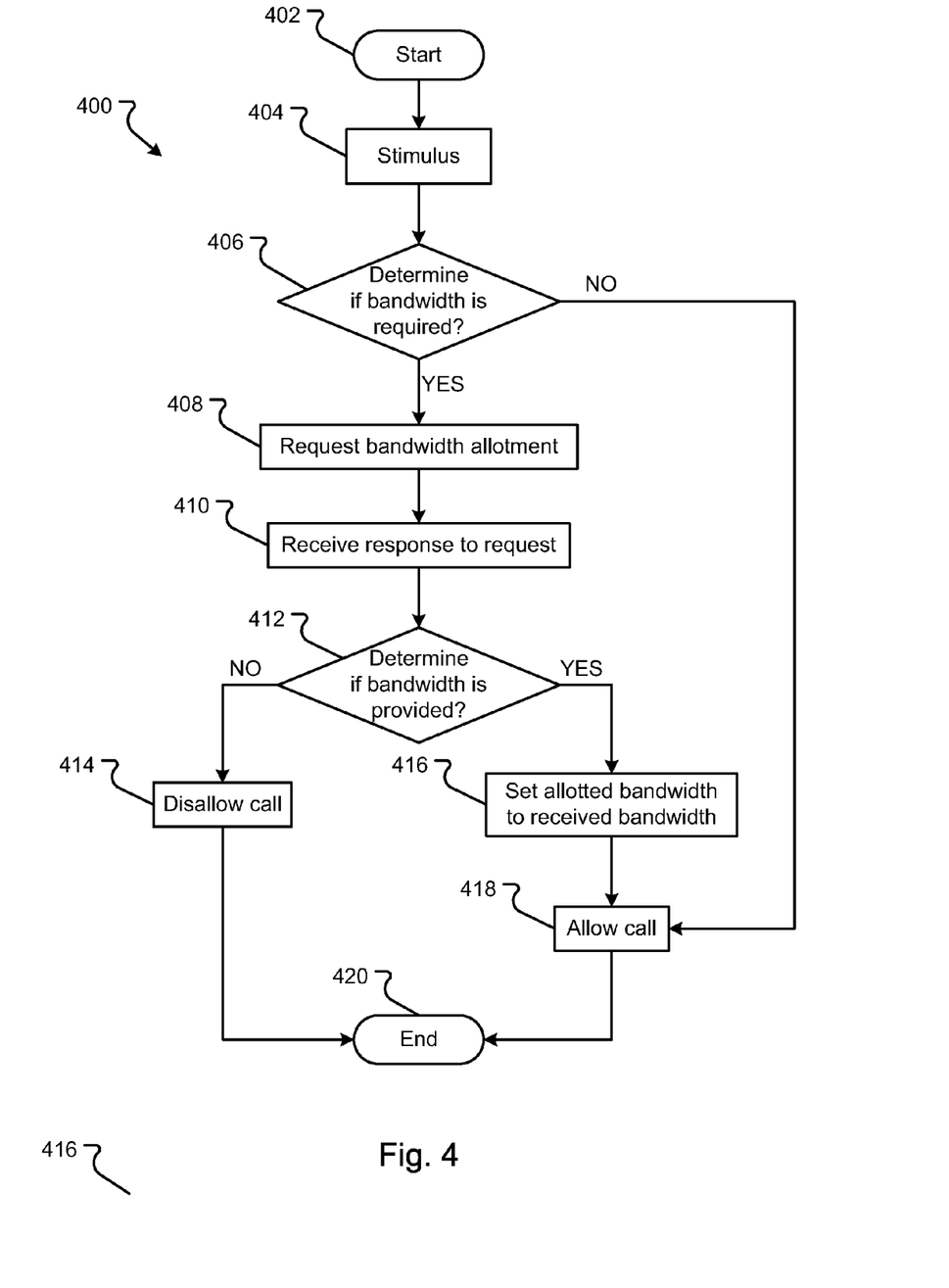
FIG. 4 is a flow diagram of an embodiment of a process for an access element to request bandwidth resources.

An embodiment of a method 400, from the perspective of the access element 106, 108, and/or 110, for receiving bandwidth from the cloud 104 is shown in FIG. 4. Generally, the method 400 begins with a start operation 402 and terminates with an end operation 416. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, etc. described in conjunction with FIGS. 1-3. Further, the access element 106, 108, and/or 110 shall be delineated as access element 106 and the providing server shall be delineated as server 102 of the cloud 104. It should be noted that any access element 106, 108, and/or 110 may function either as the requesting access element.

The requesting access element 106 receives a stimulus, in step 404. A stimulus may be the initial creation of the device group serviced by the access element 106, a request for a call from a device, a request for a call, or a recovery from a failure event (e.g., a network outage) by the access element 106 or a device. A requesting access element 106 may restart or initialize in response to the stimulus.

Upon initialization, the requesting access element 106 will determine if there is enough bandwidth to address the stimulus, in step 406. To accomplish the determination, the call/data processing server 202 of the requesting access element 106 can search a database for previously allotted bandwidth or whether bandwidth has previously been allotted. In alternative embodiments, the bandwidth negotiation module 206 may store and search for bandwidth information for the call/data processing server 202. If there is no bandwidth required, step 406 proceeds NO to step 418. If bandwidth is required, step 406 proceeds YES to step 408.

In step 408, the access element 106 requests bandwidth from the cloud 104. The bandwidth negotiation module 206 can signal the API 204 to request the bandwidth. Then, the API 204 can search for location information or other identifying information for a server 102 of the cloud 104. The request 300 sent by the API 204 can be as described in conjunction with FIG. 3. Thus, the bandwidth negotiation module 206 can determine the minimum and maximum bandwidth requirements to provided to the API 204. The API 204 places this information in the request that is sent to the cloud 104. The API 204 may then receive a response from the cloud 104, in step 410.

The bandwidth negotiation module 206 receives the information from the response from the API 204. From the information, the bandwidth negotiation module 206 determines if the bandwidth is provided. In embodiments, the cloud 104 can either deny the bandwidth allotment or provide a bandwidth allotment between or at the minimum and/or maximum bandwidth needs (as described in conjunction with FIG. 3). If no bandwidth is allotted, the bandwidth negotiation module 206 can signal the call/data processing server 202, and step 412 flows NO to step 414, where the call/data processing server 202 can deny a call. If bandwidth is allotted, the bandwidth negotiation module 206 can signal the call/data processing server 202 with the amount of bandwidth allotted or with a signal that calls may be made, and step 412 flows YES to step 416.

In step 416, the bandwidth negotiation module 206 of the requesting access element 106 sets the available bandwidth to the received bandwidth, which is the maximum allowed bandwidth for the devices. Then, the bandwidth negotiation module 206 can provide the bandwidth allotment to the call/data processing server 202. The call/data processing server 202 can then receives calls or allows calls, in step 418, with the allotted bandwidth.

Figure 5:
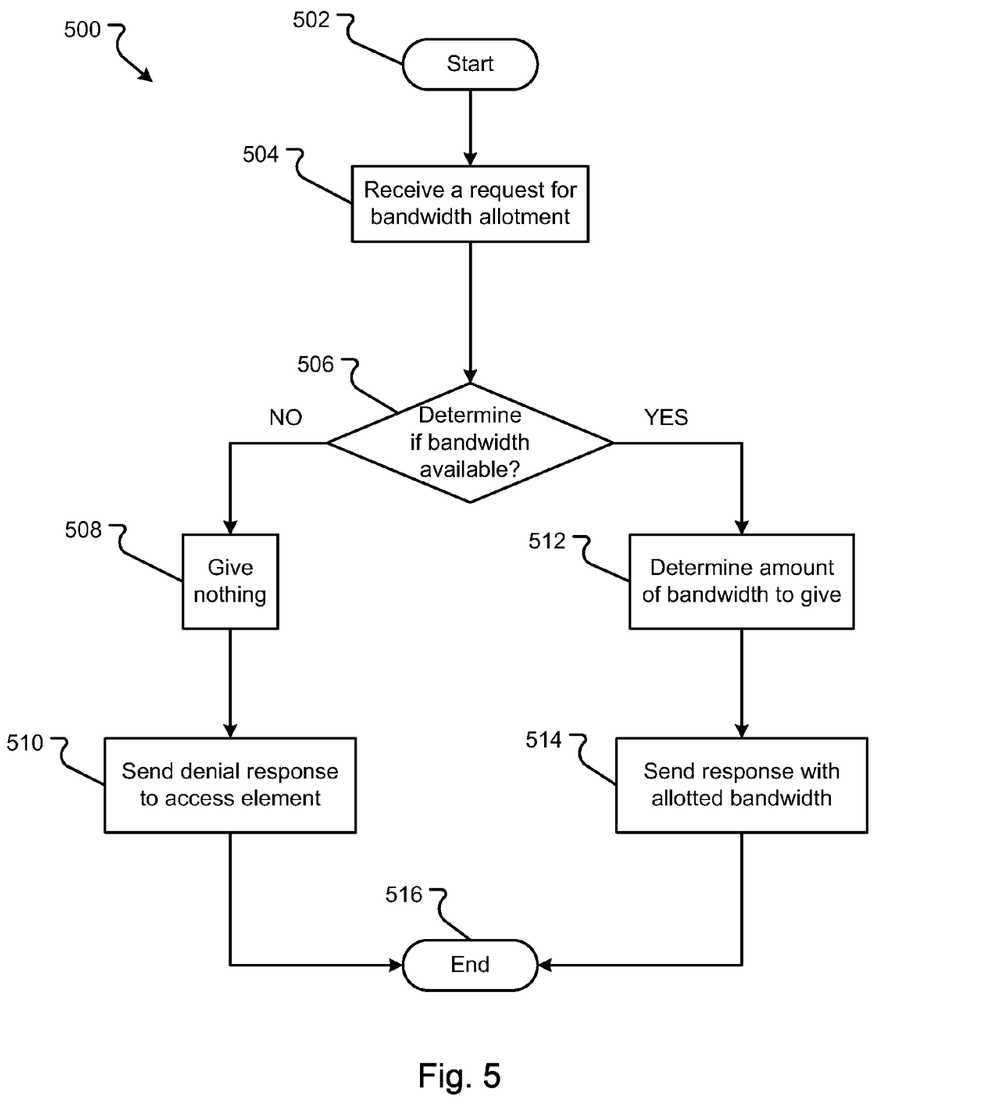
FIG. 5 is a flow diagram of an embodiment of a process for a cloud member to respond to a request for bandwidth resources.

An embodiment of a method 500, from the perspective of the bandwidth providing server 102 in the cloud 104, for providing bandwidth to a requesting access element 106 is shown in FIG. 5. Generally, the method 500 begins with a start operation 502 and terminates with an end operation 516. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, etc. described in conjunction with FIGS. 1-3. Further, the requesting access element shall be delineated as access element 106 and the providing server shall be delineated as server 102. It should be noted that any server within the cloud 104 may function as the providing server.

The providing server 102 receives a request from a access element 106 for bandwidth. The bandwidth request may ask for an initial allotment (that is, the access element 106 needs a first allotment rather than an increase in the existing allotment). Thus, the providing server 102 can try to give as much bandwidth as possible to the requesting access element 106 rather than a set amount. The providing server 102 determines the minimum bandwidth the access element 106 needs to keep (minK), the maximum bandwidth to give (MaxG), and the available bandwidth as described in U.S. Patent Publication No. 2010/0278327, published on Nov. 4, 2010, which is incorporated by reference herein in its entirety for all that it teaches and for all purposes. MinK is the maximum of the used bandwidth, the low bandwidth threshold, or the per call bandwidth. MaxG is the amount of administered bandwidth divided by the number of servers in the cloud 104 (e.g. 60,000 MBps/6 servers=10,000 MBps per server). Available bandwidth is the result of minimum bandwidth minus used bandwidth.

The providing server 104 then determines if the available bandwidth is greater than the minimum bandwidth asked for by the access element 106, in step 506. In other words, does the providing server 102 have more bandwidth available than the minimum bandwidth requested. If available bandwidth is greater than minimum bandwidth, the step 506 flows YES to step 512. If available bandwidth is not greater than minimum bandwidth, the method 500 flows NO to step 508.

In step 508, the server 102 determines to give nothing to the requesting access element 106. The server 102 then sends a denial response to the API 204 of the access element 106. The denial response denies the request for bandwidth. In step 512, the server 102 determines the amount of bandwidth to give. In embodiments, the server 102 compares the available bandwidth to the maximum bandwidth request in the request from the access element 106. If there is more available bandwidth that the maximum bandwidth, the server 102 provides the maximum bandwidth. However, if the available bandwidth is less than the maximum bandwidth, the server 102 provides the available bandwidth. A response is generated with the amount of provided bandwidth and sent from the server 102 to the access element 106, in step 514. The determination of bandwidth allotment for an access element 106 may also be as described in U.S. Patent Publication No. 2010/0278327, published on Nov. 4, 2010, which is incorporated by reference herein in its entirety for all that it teaches and for all purposes.

Figure 6:
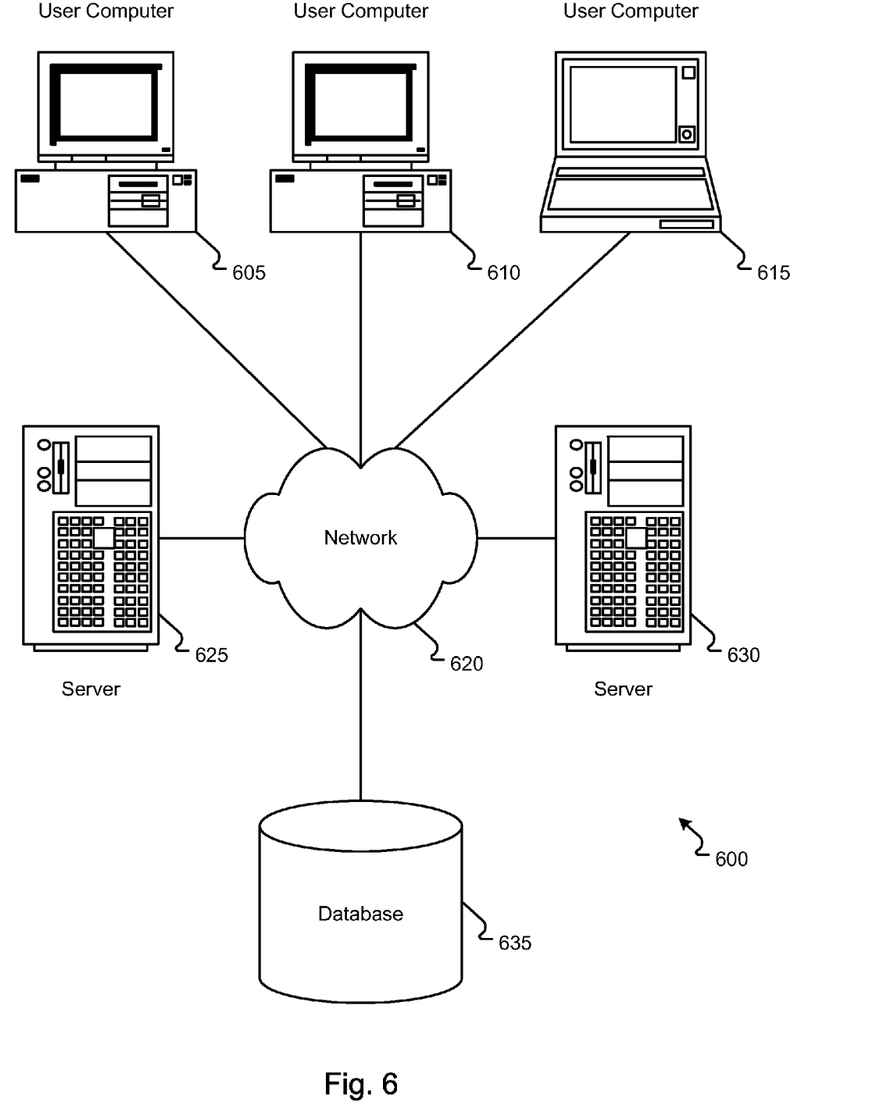
FIG. 6 is a block diagram of an embodiment of a computer system environment in which the systems and methods may be executed.

FIG. 6 illustrates a block diagram of a computing environment 600 that may function as the systems. The system 600 includes one or more user computers 605, 610, and 615. The user computers 605, 610, and 615 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 605, 610, 615 may also have any of a variety of applications, including for example, database client and/or server applications, and web browser applications. Alternatively, the user computers 605, 610, and 615 may be any other electronic device, such as a thin-client computer, Internet-enabled mobile telephone, and/or personal digital assistant, capable of communicating via a network (e.g., the network 620 described below) and/or displaying and navigating web pages or other types of electronic documents. Although the exemplary system 600 is shown with three user computers, any number of user computers may be supported.

System 600 further includes a network 620. The network 620 can be any type of network familiar to those skilled in the art that can support data communications using any of a variety of commercially-available protocols, including, without limitation, TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks.

The system 600 may also include one or more server computers 625, 630. One server may be a web server 625, which may be used to process requests for web pages or other electronic documents from user computers 605, 610, and 615. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 6 illustrates a separate web server 625 and file/application server 630, those skilled in the art will recognize that the functions described with respect to servers 625, 630 may be performed by a single server and/or a plurality of specialized servers, depending on implementation-specific needs and parameters. The computer systems 605, 610, and 615, file server 625 and/or application server 630 may function as server 102, access element 106, 108, and/or 110, or other systems described herein.

The system 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these. In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i™, that is adapted to store, update, and retrieve data in response to SQL-formatted commands.

Figure 7:
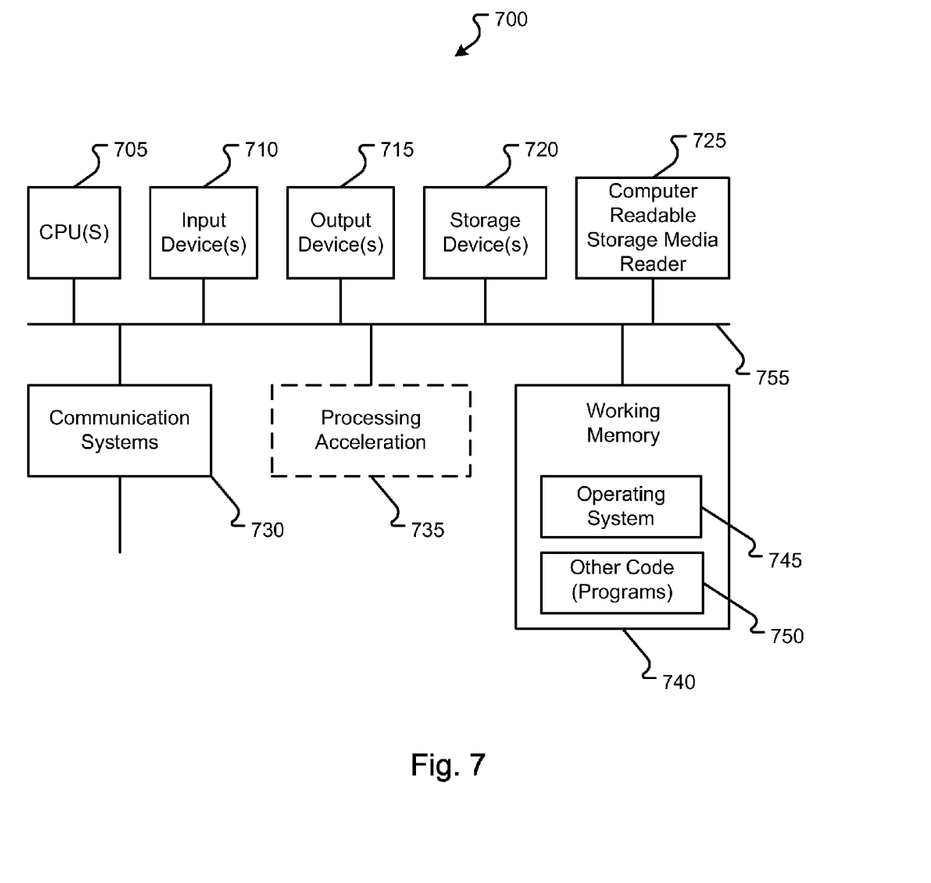
FIG. 7 is a block diagram of a computer system in which the systems and methods may be executed.

FIG. 7 illustrates one embodiment of a computer system 700 that systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 740, including an operating system 745 and/or other code 750. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for administering telephone calls, comprising:
an access element receiving a call request, wherein the access element communicates with a cloud that provides resources for telephone calls in an enterprise network;
in response to the call request, the access element determining if the access element has been allotted enough bandwidth to manage the call request;
if enough bandwidth has not been allotted, the access element requesting, from the cloud, bandwidth;
the access element receiving a response from the cloud, wherein the response either denies the request or allots bandwidth;
if the response denies the request, the access element denying the call;
if enough bandwidth has been allotted or the response allots bandwidth, the access element executing the call;
the access element receiving a stimulus, wherein the stimulus is different than the received call request; and
the access element requesting bandwidth in response to the stimulus.

2. The method as defined in claim 1, wherein the access element communicates with the cloud using SIP.

3. The method as defined in claim 2, wherein the request to the cloud includes a minimum bandwidth need and a maximum bandwidth need.

4. The method as defined in claim 3, wherein the allotted bandwidth from the cloud is at or above the minimum bandwidth and at or below the maximum bandwidth.

5. The method as defined in claim 2, wherein the access element receives the call request from a device.

6. The method as defined in claim 5, wherein the stimulus is a failure event by the access element or the device that sent the call request.

7. The method as defined in claim 5, wherein the access element receives the call request from the device using a legacy protocol.

8. The method as defined in claim 1, wherein the access element allots the allotted bandwidth between two or more devices.

9. The method as defined in claim 1, wherein the cloud includes two or more servers that manage the bandwidth for the enterprise network.

10. The method as defined in claim 9, wherein the servers negotiate for bandwidth within the cloud.

11. The method as defined in claim 1, wherein the stimulus is an initial creation of a device group serviced by the access element.

12. A system for administering calls comprising:
an access element, the access element in communication with a caller using a legacy protocol;
a cloud in communication with the access element using SIP, the cloud comprising:
a network; and
two or more servers, wherein at least one server communicates with an access element, wherein each server comprises;
a control table, the control table storing control information associated with bandwidth administration;
a call processing server in communication with the control table, wherein each call processing server for each server forms a group to administer bandwidth for the system; and
wherein at least one server determines whether to provide bandwidth to an access element, receives a stimulus, determines if another call processing server is active in response to the stimulus, if no other call processing server is active, sets an allotted bandwidth for the call processing server equal to the administered bandwidth, wherein the administered bandwidth is total bandwidth for the network, sets the call processing server as an administrator for the group of call processing servers, if another call processing server is active, requests to join the group, requests bandwidth from another call processing server, and receives an allotment of bandwidth.

13. The server as defined in claim 12, wherein the control table includes dynamic control information.

14. The server as defined in claim 12, wherein the control table includes data fields for one or more of an administrator bit, a location, maximum bandwidth allowed, allotted bandwidth, per call bandwidth, currently used bandwidth, and a low bandwidth threshold.

15. The server as defined in claim 12, wherein the call processing server provides at least a portion of the allotment of bandwidth to the access element.

16. A non-transitory computer program including computer executable instructions stored onto a non-transitory computer readable medium which, when executed by a processor of a computer, causes the computer to perform a method for requesting more bandwidth from a cloud, the instructions comprising:
instructions to receive an incoming call;
instructions to determine if a sum of a bandwidth for the incoming call and a value for used bandwidth is greater than a value for allotted bandwidth;

if the sum of the bandwidth for the incoming call and the value for used bandwidth is not greater than the allotted bandwidth, instructions to allow the incoming call;

if the sum of the bandwidth for the incoming call and the value for used bandwidth is greater than the allotted bandwidth, instructions to request more bandwidth from at least one server in the cloud;

instructions to determine if bandwidth is received;

if bandwidth is received, instructions to allow the incoming call;

if no bandwidth is received, instructions to deny the incoming call;

instructions to receive a stimulus, wherein the stimulus is different than the received call request; and instructions to request bandwidth in response to the stimulus.

17. The non-transitory computer program as defined in claim 16, wherein the access element receives the incoming call over a legacy protocol and wherein the access element includes an API to communicate with the cloud using SIP.

18. The non-transitory computer program as defined in claim 17, wherein the request for more bandwidth includes a minimum bandwidth needed and a maximum bandwidth needed.

19. The non-transitory computer program as defined in claim 18, wherein the server determines whether available bandwidth is more than the minimum bandwidth needed and wherein, if the available bandwidth is more than the minimum bandwidth needed, providing at least the minimum bandwidth.

20. The non-transitory computer program as defined in claim 19, wherein the server further determines whether available bandwidth is less than the maximum bandwidth needed and wherein, if the available bandwidth is less than the maximum bandwidth needed, providing at least the minimum bandwidth but less than the maximum bandwidth.

* * * * *